US011946377B2

United States Patent
Gupta et al.

(10) Patent No.: US 11,946,377 B2
(45) Date of Patent: Apr. 2, 2024

(54) VARIABLE NOZZLE DEVICE, TURBINE, AND TURBOCHARGER

(71) Applicant: MITSUBISHI HEAVY INDUSTRIES ENGINE & TURBOCHARGER, LTD., Sagamihara (JP)

(72) Inventors: Bipin Gupta, Tokyo (JP); Toyotaka Yoshida, Tokyo (JP); Yuya Nakahara, Tokyo (JP); Yosuke Dammoto, Sagamihara (JP); Yoji Akiyama, Sagamihara (JP)

(73) Assignee: MITSUBISHI HEAVY INDUSTRIES ENGINE & TURBOCHARGER, LTD., Kanagawa (JP)

( * ) Notice: Subject to any disclaimer, the term of this patent is extended or adjusted under 35 U.S.C. 154(b) by 0 days.

(21) Appl. No.: 17/796,550

(22) PCT Filed: Feb. 17, 2020

(86) PCT No.: PCT/JP2020/005989
§ 371 (c)(1),
(2) Date: Jul. 29, 2022

(87) PCT Pub. No.: WO2021/166021
PCT Pub. Date: Aug. 26, 2021

(65) Prior Publication Data
US 2023/0050463 A1 Feb. 16, 2023

(51) Int. Cl.
*F04D 29/44* (2006.01)
*F01D 17/16* (2006.01)

(52) U.S. Cl.
CPC ........ *F01D 17/165* (2013.01); *F05D 2220/40* (2013.01)

(58) Field of Classification Search
CPC ............... F02B 37/24; F05D 2240/128; F05D 2220/40; F01D 17/165; F04D 27/002
(Continued)

(56) References Cited

U.S. PATENT DOCUMENTS 11,572,823 B2 * 2/2023 Hayashi .................. F02B 39/00
2008/0223039 A1 9/2008 Sumser et al.
(Continued)

FOREIGN PATENT DOCUMENTS

JP 41-11484 B1 6/1966
JP 62-180634 U 11/1987
(Continued)

OTHER PUBLICATIONS

International Preliminary Report on Patentability and Written Opinion of the International Searching Authority for International Application No. PCT/JP2020/005989, dated Sep. 1, 2022, with an English translation.
(Continued)

*Primary Examiner* — Long T Tran
*Assistant Examiner* — James J Kim
(74) *Attorney, Agent, or Firm* — BIRCH, STEWART, KOLASCH & BIRCH, LLP

(57) ABSTRACT

A variable nozzle device 20 for a variable geometry turbocharger includes: a nozzle mount 21; a nozzle plate 22 disposed so as to face the nozzle mount, the nozzle plate forming a nozzle flow passage 4 having an annular shape between the nozzle plate 22 and the nozzle mount 21; and a plurality of variable nozzle vanes 6 disposed at a predetermined interval in a circumferential direction of the nozzle flow passage 4 so as to be individually rotatable about a pivot axis O2. The nozzle plate 22 includes a first surface 33 facing the nozzle mount 21, a second surface 34 opposite to the first surface 33, and at least one through hole 36 formed through the first surface 33 and the second surface 35. The at least one through hole 36 has a first opening 36a formed on the first surface 33 at an inner side of the pivot axis with respect to a radial direction, and a second opening 36b formed on the second surface 35 at an outer side of the first
(Continued)

opening 36*a* with respect to the radial direction or at the same position as the first opening 36*a* with respect to the radial direction. Accordingly, as the working fluid 'g' injected from the through hole 36 joins the working fluid G flowing through the nozzle flow passage 4 toward the turbine wheel 3 through the plurality of variable nozzle vanes 6, the flow of the working fluid G is guided toward the inner surface at the hub 32 side, and thereby it is possible to suppress deviation of flow of the working fluid G toward the shroud, that is, suppress the drift of the working fluid G.

13 Claims, 11 Drawing Sheets

(58) Field of Classification Search
USPC .......................................................... 415/203
See application file for complete search history.

(56) References Cited

U.S. PATENT DOCUMENTS

| | | |
|---|---|---|
| 2017/0198593 A1 | 7/2017 | Yoshida et al. |
| 2018/0030848 A1* | 2/2018 | Kobayashi ............ F01D 17/165 |
| 2018/0149078 A1* | 5/2018 | Sakamoto ............. F01D 17/165 |
| 2020/0123966 A1* | 4/2020 | Yokoyama ................ F02C 6/12 |
| 2021/0164384 A1* | 6/2021 | Gupta ................... F01D 17/165 |

FOREIGN PATENT DOCUMENTS

| | | | |
|---|---|---|---|
| JP | 2009-8013 A | | 1/2009 |
| JP | 2009008013 A | * | 1/2009 |
| JP | 2013-245655 A | | 12/2013 |
| WO | WO 2016/031017 A1 | | 3/2016 |

OTHER PUBLICATIONS

International Search Report for International Application No. PCT/JP2020/005989, dated Apr. 14, 2020.
Chinese Office Action and Search Report for Chinese Application No. 202080096509.4, dated Apr. 12, 2023.

* cited by examiner

VARIABLE NOZZLE DEVICE, TURBINE, AND TURBOCHARGER

TECHNICAL FIELD

The present disclosure relates to a variable nozzle device, a turbine, and a turbocharger.

BACKGROUND ART

A radial turbine and a mixed-flow turbine including a flow-rate adjustment device for exhaust gas to be introduced into a turbine have a great advantage that the turbine rotation speed and the turbine speed are variable or that it is possible to ensure a high responsiveness to a change in the output of an engine, for instance, and thus often provided for a turbocharger to be mounted to an automobile engine, an expansion turbine used in a power-generation engine, a small-sized gas turbine, etc.

A turbocharger provided with a radial turbine or a mixed-flow turbine is configured to rotary drive a turbine with exhaust gas (working fluid) from an engine, for instance, while compressing intake air by rotary driving a compressor coaxially coupled to the turbine and supplying the compressed intake air to the engine.

Meanwhile, a flow-rate adjustment device for exhaust gas is disposed in an annular nozzle flow passage defined by a turbine housing at the outer peripheral side of a turbine wheel, and includes a plurality of nozzle vanes arranged in the circumferential direction.

Furthermore, a flow-rate adjustment device for exhaust gas may include a variable nozzle device including a plurality of variable nozzle vanes which are driven by an actuator to rotate and arranged such that a leading edge of one of adjacent nozzle vanes and a trailing edge of the other one of the adjacent nozzle vanes overlap with one another to close the flow passage in a closing operation, whereby the size of the flow passage of exhaust gas, that is, the flow rate of exhaust gas is flexibly adjustable in accordance with the amount of rotation of the respective variable nozzle vanes.

A variable geometry turbocharger/turbine having such a variable nozzle device is capable of operation in accordance with load change of the engine, and has an especially high responsiveness when the load is low.

However, it is known that, in a variable geometry turbocharger, when the opening degree of the variable nozzles (variable nozzle vanes) is small, the turbine efficiency decreases compared to a peak point, that is, when the nozzle opening degree is near the intermediate opening-degree range). The turbine efficiency at the time when the nozzle opening degree is in the small opening-degree range affects the responsiveness considerably, and thus it is desirable to improve the turbine efficiency in the small opening-degree range.

When the variable nozzles 6 are in the small opening-degree range, exhaust gas (working fluid G) flowing into the turbine rotor blades 13 has a strong swirling component due to the small nozzle opening degree, but the flow-velocity component directed inward in the radial direction is small (FIG. 11). Thus, as depicted in FIG. 11, in the case of a typical variable geometry turbocharger (variable nozzle device 100), in the small opening-degree range of the variable nozzles 6, exhaust gas G is likely to be attracted toward the inner surface 31 at the side of the shroud (shroud portion 30) due to a centrifugal force generated by a swirl component of the exhaust gas G flowing into the turbine rotor blades 13. When the exhaust gas G is attracted to the shroud side, the exhaust gas G flows closer to the shroud side at the outlet of the turbine rotor blades 13, and the flow velocity increases at the shroud side and reduces near the inner surface 32 at the hub (turbine hub 12) side. As a result, the flow of exhaust gas spreads so as to cancel the imbalance of flow velocity at the downstream side of the rotor blades 13, and thereby mixing loss is likely to occur.

In this regard, Patent Document 1 discloses a turbine and a turbocharger provided with a protruding portion protruding toward the inner surface at the hub side, disposed on the inner surface at the shroud side, in order to suppress distortion of the flow of exhaust gas toward the shroud side.

In the turbine and the turbocharger of Patent Document 1 configured to include the protruding portion, exhaust gas flows along the protruding portion and is guided toward the inner surface at the hub side, and thereby it is possible to suppress deviation of the flow of exhaust gas toward the shroud side, that is, drift of exhaust gas. Thus, the uneven flow at the outlet of the turbine rotor blades is mitigated and mixing loss is reduced, whereby it is possible to improve the turbine efficiency. Accordingly, in addition to the above described the advantage of ensuring the maximum flow rate in the large opening-degree range of the variable nozzles, it is possible to achieve another advantage of improving the turbine efficiency in the small opening-degree range of the variable nozzles.

CITATION LIST

Patent Literature

Patent Document 1: WO2016/031017A

SUMMARY

Problems to be Solved

As described above, the turbine and the turbocharger disclosed in Patent Document 1 are provided with the protruding portion, and thus it is possible to suppress drift of exhaust gas toward the shroud side by guiding the flow of exhaust gas toward the hub side when the variable nozzles are in the small opening-degree range. However, when the variable nozzles are in the large opening-degree range, the protruding portion becomes resistance that causes fluid energy loss of exhaust gas, which may deteriorate the turbine efficiency. In this regard, room for further improvement is still present.

In view of the above, an object of the present disclosure is to provide a variable nozzle device, a turbine, and a turbocharger capable reducing fluid energy loss of a working fluid in all ranges including the small opening-degree range and the large opening-degree range of the variable nozzles, thereby improving the turbine efficiency even more effectively.

Solution to the Problems

According to an aspect of the present disclosure, a variable nozzle device for a variable geometry turbocharger includes: a nozzle mount; a nozzle plate disposed so as to face the nozzle mount, the nozzle plate forming a nozzle flow passage having an annular shape between the nozzle plate and the nozzle mount; and a plurality of variable nozzle vanes disposed at intervals in a circumferential direction of the nozzle flow passage so as to be individually rotatable about a pivot axis. The nozzle plate includes a first surface facing the nozzle mount, a second surface opposite to the first surface, and at least one through hole formed through the first surface and the second surface. The at least one through hole has a first opening formed on the first surface at an inner side of the pivot axis with respect to a radial direction, and a second opening formed on the second surface at an outer side of the first opening with respect to the radial direction or at the same position as the first opening with respect to the radial direction.

According to an aspect of the present disclosure, a variable nozzle device for a variable geometry turbocharger includes: a nozzle mount; a nozzle plate disposed so as to face the nozzle mount, the nozzle plate forming a nozzle flow passage having an annular shape between the nozzle plate and the nozzle mount; and a plurality of variable nozzle vanes disposed at intervals in a circumferential direction of the nozzle flow passage so as to be individually rotatable about a pivot axis. The nozzle plate includes a first surface facing the nozzle mount and a slide member configured to be capable of advancing and retreating with respect to the nozzle flow passage from the first surface. The slide member includes a first side facing the nozzle flow passage and a second side opposite to the first side, the slide member being configured to advance or retreat in accordance with a pressure difference between a pressure applied to the first side and a pressure applied to the second side.

According to an aspect of the present disclosure, a turbine includes: a rotational shaft; a turbine wheel disposed on a first end side of the rotational shaft and the above-described variable nozzle device.

According to an aspect of the present disclosure, a turbocharger includes the above-described turbine.

Advantageous Effects

With the variable nozzle device, the turbine, and the turbocharger according to an aspect of the present disclosure, it is possible to reduce fluid energy loss of a working fluid in all ranges including the small opening-degree range and the large opening-degree range of the variable nozzles (variable nozzle vanes), thereby improving the turbine efficiency even more effectively.

DETAILED DESCRIPTION

First Embodiment

Now, with reference to FIGS. 1 to 5 and 11, a variable nozzle device, a turbine, and a turbocharger according to the first embodiment will be described.

(Turbocharger)

The turbocharger according to the present embodiment is a turbo apparatus that improves the output of an engine by utilizing energy of a working fluid (exhaust gas) discharged from the engine. The turbocharger rotary drives a turbine with exhaust gas discharged from the engine, and thereby rotary drives a compressor coaxially coupled to the turbine to compress intake air, and supplies the compressed intake air to the engine.

Figure 1:
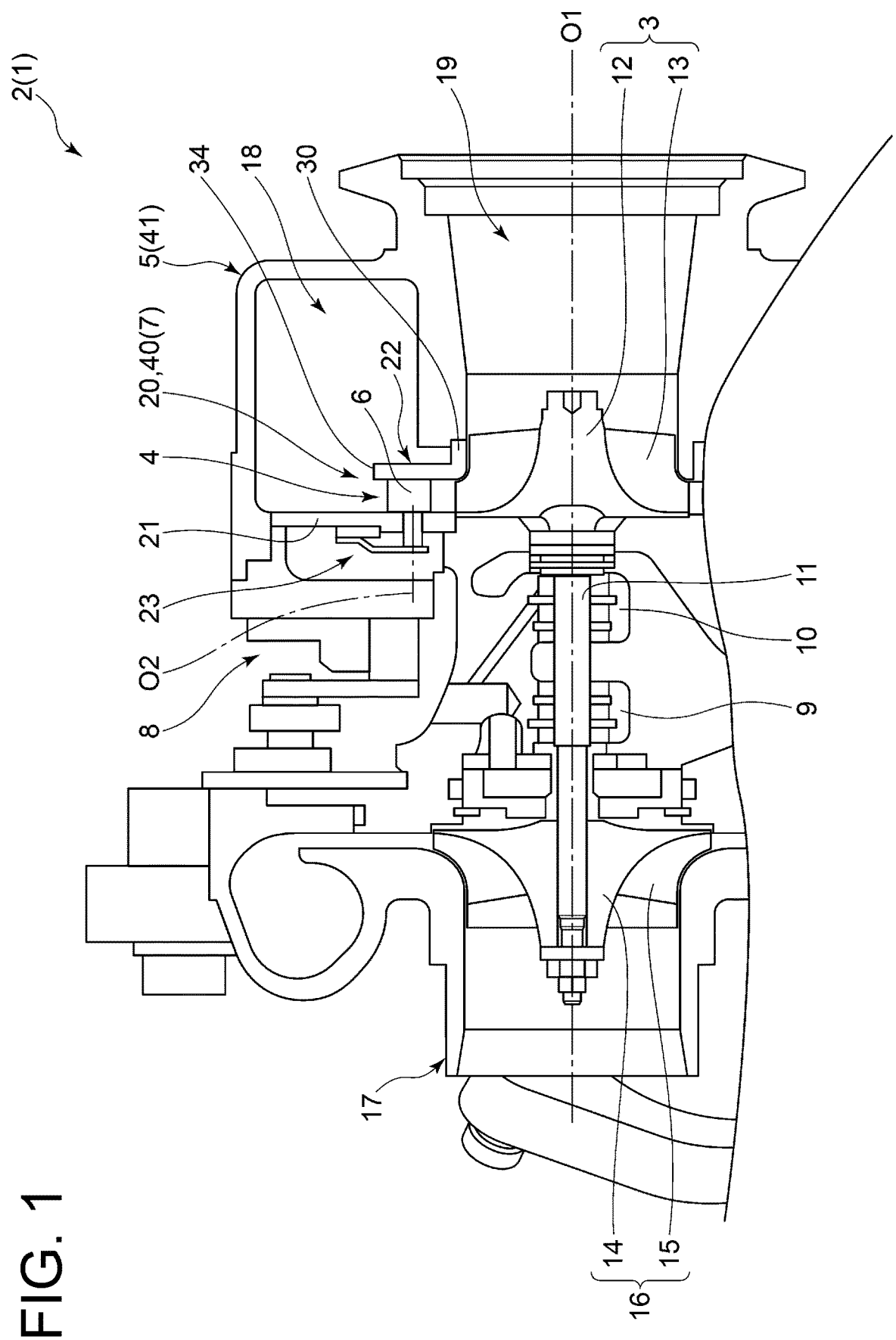
FIG. 1 is a cross-sectional view showing a turbine and a turbocharger according to the first embodiment and the second embodiment.

Specifically, the turbocharger 1 according to the present embodiment includes a radial turbine 2 or a mixed-flow turbine (hereinafter, referred to as turbine) as depicted in FIG. 1.

(Turbine)

Figure 2:
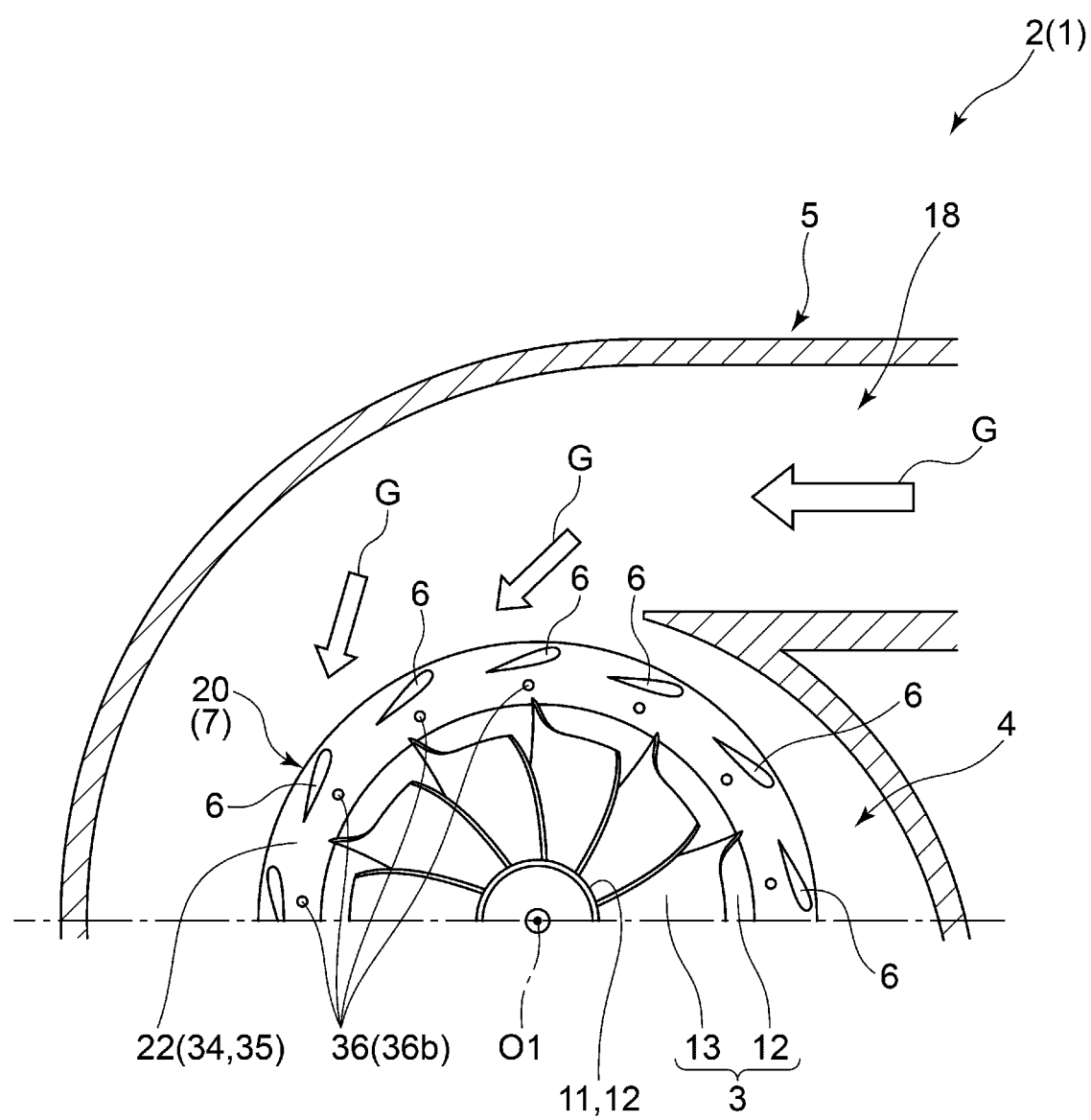
FIG. 2 is a cross-sectional view showing a variable nozzle device, a turbine, and a turbocharger according to the first embodiment as seen in the axis direction (downstream side in the flow direction of the working fluid).

As depicted in FIGS. 1 and 2, the turbine 2 includes a turbine wheel 3 that rotates around the axis O1 of the turbocharger 1, a turbine housing 5 that houses the turbine wheel 3 and forms a nozzle flow passage 4 having an annular shape at the outer peripheral side centered at the axis O1 of the turbine wheel 3, and a flow-rate adjustment device (flow-rate adjustment mechanism of a working fluid (exhaust gas G in the present embodiment)) 7 disposed in the nozzle flow passage 4 at the outer side of the turbine wheel 3 with respect to the radial direction, including a plurality of variable nozzle vanes 6 arranged at a predetermined interval in the circumferential direction of the turbine wheel 3.

The turbine wheel 3 includes, at one end side of a rotational shaft 11 rotatably supported by journal bearings 9, 10 housed in a bearing housing 8, a turbine hub 12 disposed on the same axis O1 and provided integrally so as to have a substantially truncated conical shape, and a plurality of turbine rotor blades 13 disposed at a predetermined interval in the circumferential direction centered at the axis O1 on the circumferential surface of the turbine hub 12.

At the other end side of the rotational shaft 11, a compressor hub 14 having a substantially truncated conical shape is disposed integrally, and a plurality of compressor blades 15 are disposed at a predetermined interval in the circumferential direction on the circumferential surface of the compressor hub 14.

The compressor hub 14 and the compressor blades 15 constitute a compressor wheel 16. The compressor wheel 16 is housed in the compressor housing 17 rotatably about the axis O1.

In the present embodiment, the turbine housing 5 has, inside thereof, a scroll flow passage 18 being in communication with the nozzle flow passage 4 and configured to let the working fluid G introduced from the outside of the turbine housing 5 flow to the nozzle flow passage 4, and an exhaust flow passage 19 having a tubular shape being in communication with the nozzle flow passage 4 and extending along the axis O1 and configured to let the working fluid G after driving the turbine wheel 3 flow out to the outside of the turbine housing 5.

(Variable Nozzle Device)

Meanwhile, the turbocharger 1 according to the present embodiment is a variable-geometry type turbocharger, and configured such that the flow-rate adjustment device 7 includes a variable nozzle device 20.

Figure 11:
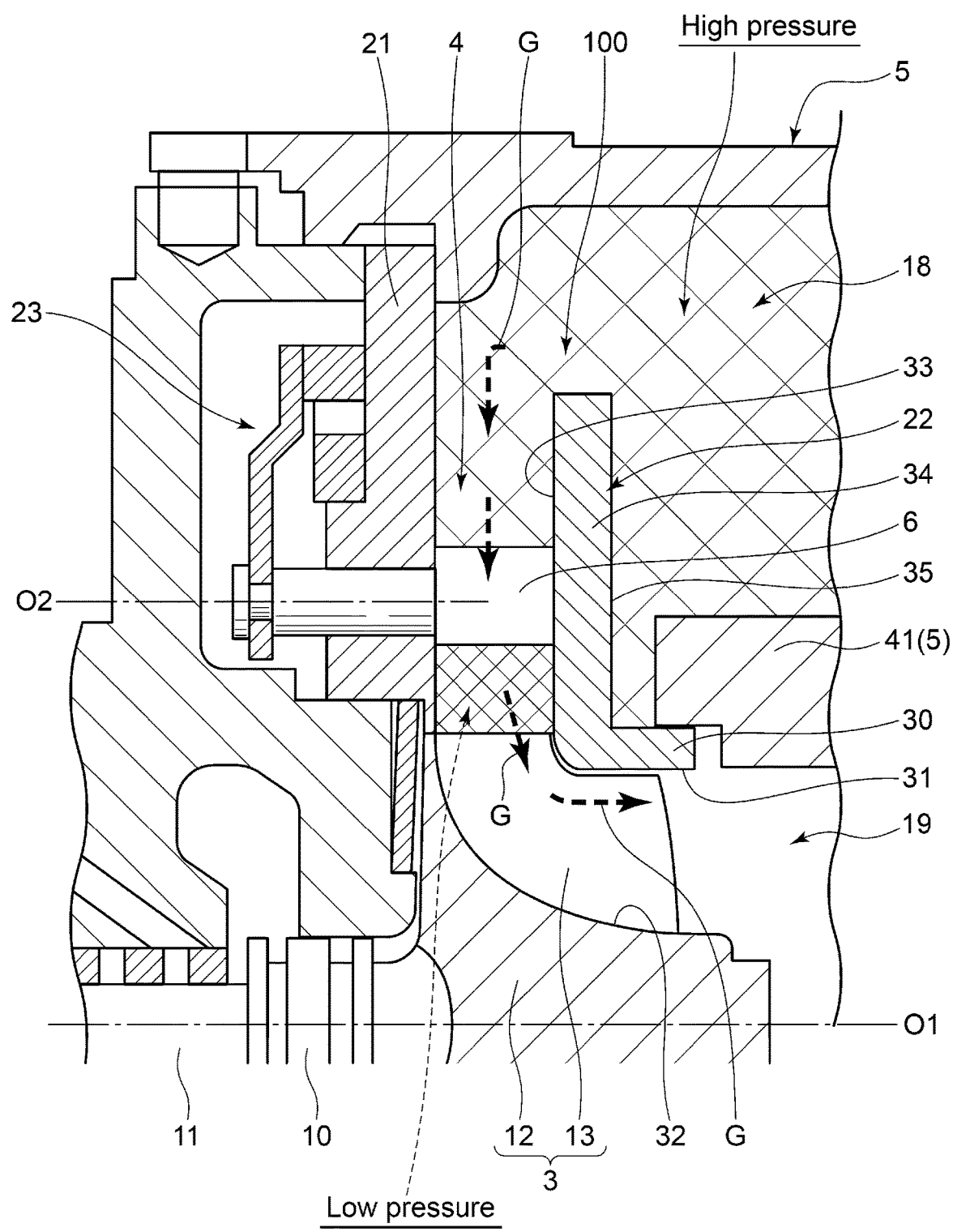
FIG. 11 is a cross-sectional view showing a typical variable nozzle device (turbine, turbocharger).

Similarly to the typical variable nozzle device 100 depicted in FIG. 11, the variable nozzle device 20 includes a nozzle mount 21, a nozzle plate 22 disposed so as to face the nozzle mount 21 and form a nozzle flow passage 4 having an annular shape between the nozzle mount 21 and the nozzle plate 22, a plurality of variable nozzle vanes 6 disposed at a predetermined interval in the circumferential direction of the nozzle flow passage 4 so as to be individually rotatable about the pivot axis O2, and a nozzle rotational mechanism 23 for rotating the plurality of variable nozzle vanes 6.

Figure 3:
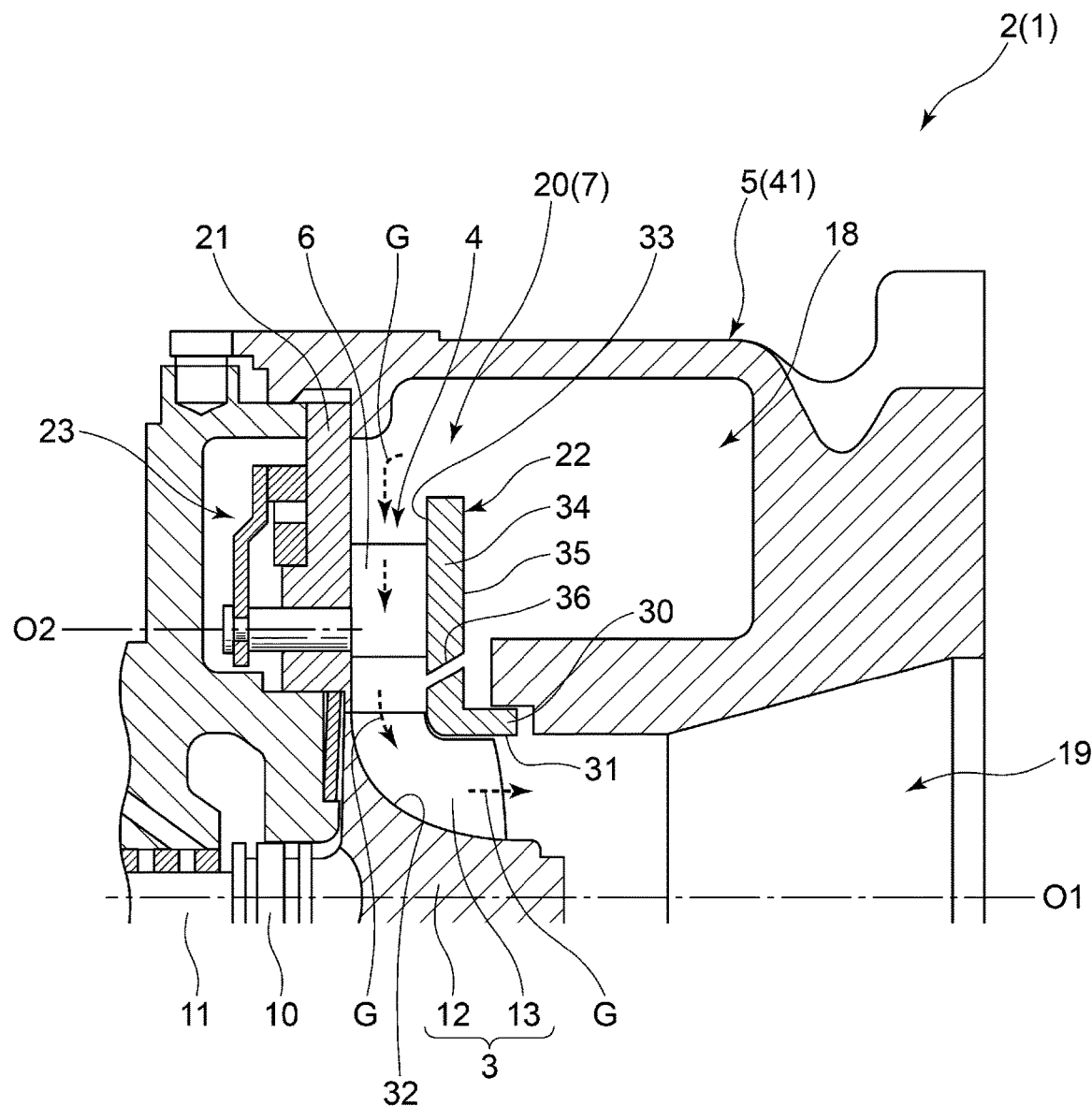
FIG. 3 is a cross-sectional view showing a variable nozzle device according to the first embodiment.
Figure 4:
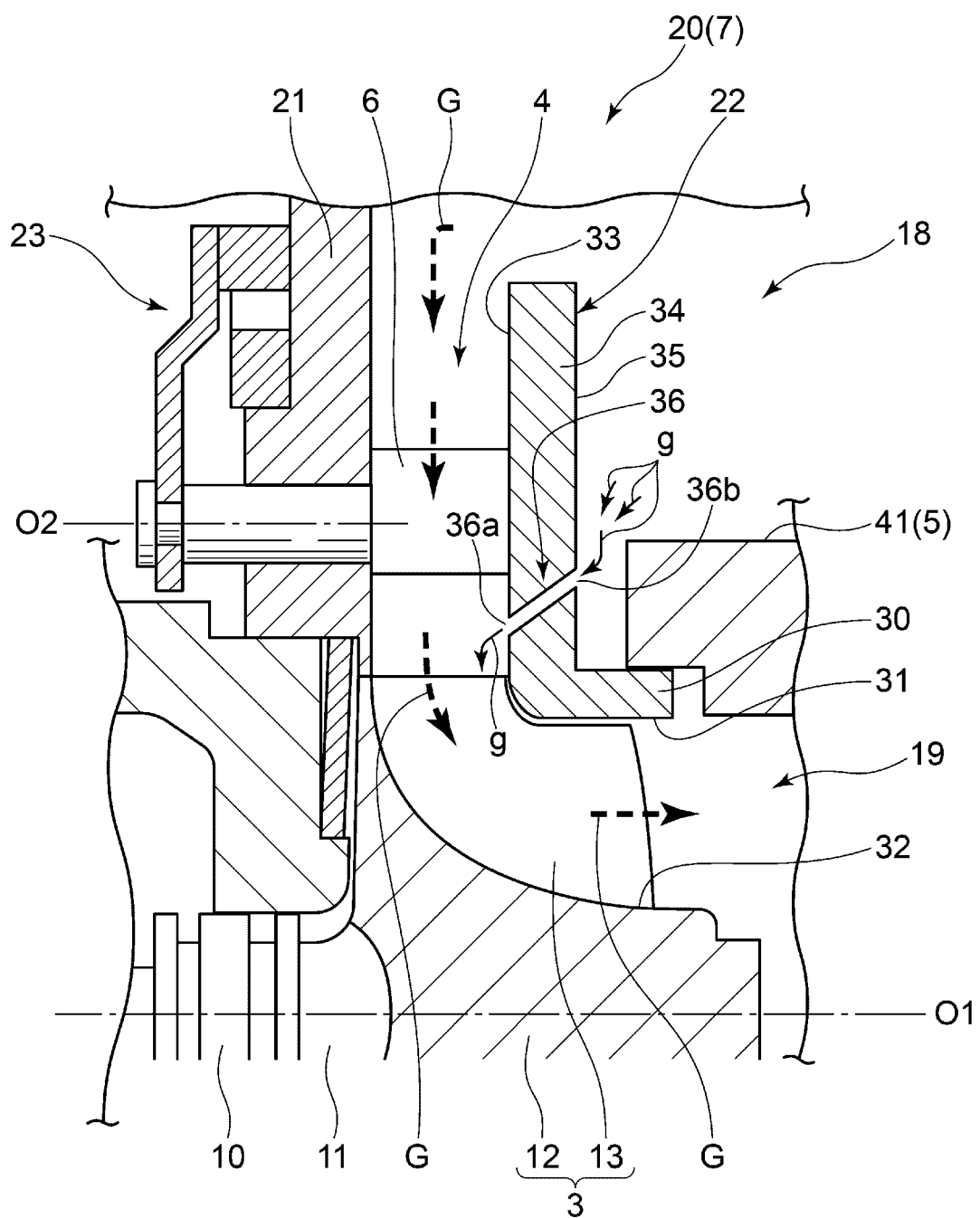
FIG. 4 is a cross-sectional view showing a variable nozzle device according to the first embodiment.

The nozzle plate 22 is formed to include, as depicted in FIGS. 3 and 4 (see FIGS. 1 and 11), a nozzle plate body part 34 having a first surface 33 facing the nozzle mount 21, and a shroud part 30 having an inner surface 31 facing the inner surface 32 at the hub side.

Furthermore, the variable nozzle device 20 according to the present embodiment includes a first surface 33 of the nozzle plate body part 34, a second surface 35 opposite to the first surface 33, and a through hole 36 formed through the first surface 33 and the second surface 35.

Furthermore, the through hole 36 of the present embodiment has a first opening 36a formed on the first surface 33 of the nozzle plate body part 34 at the inner side of the pivot axis O2 of the variable nozzle vane 6 with respect to the radial direction, and a second opening 36b formed on the second surface 35 at the outer side of the first opening 36a with respect to the radial direction. Accordingly, the through hole 36 is formed to penetrate obliquely from the second surface 53 toward the first surface 33 of the nozzle plate body part 34.

Nevertheless, the second opening 36b may be disposed at the same position as the first opening 36a in the radial direction.

Furthermore, in the present embodiment, as depicted in FIG. 2, a plurality of through holes 36 are disposed at intervals in the circumferential direction centered at the axis O1. The plurality of through holes 36 are each provided to make a pair with corresponding one of the plurality of variable nozzle vanes 6, and disposed at a position at the inner side of the corresponding one of the variable nozzle vanes 6 with respect to the radial direction.

Furthermore, the through hole 36 may be formed such that the first opening 36a has a smaller opening area than the second opening 36b.

With the variable nozzle device 20, the turbine 2, and the turbocharger 1 according to the present embodiment, it is possible to change and adjust the flow rate of the working fluid G discharged from the engine and supplied to the turbine wheel 3 flowing through the nozzle flow passage 4 from the scroll flow passage 18, by rotating the plurality of variable nozzle vanes 6 driven by the nozzle rotational mechanism 23 and changing the nozzle opening degree.

At this time, the smaller the opening degree of the variable nozzle vane 6 in the small opening-degree range, the greater the pressure difference between the upstream side (the side of the scroll flow passage 18) with respect to the flow direction of the working fluid G, which is the high-pressure side, and the downstream side with respect to the flow direction of the working fluid G, which is the low-pressure side, across the variable nozzle vane 6 (see FIG. 11).

In this regard, the variable nozzle device 20, the turbine 2, and the turbocharger 1 according to the present embodiment is provided with the through hole 36 formed through the first surface 33 and the second surface 35 of the nozzle plate body part 34, and the through hole 36 has the first opening 36a formed on the first surface 33 at the inner side of the pivot axis O2 of the variable nozzle vane 6 with respect to the radial direction, and the second opening 36b formed on the second surface 35 at the outer side of the first opening 36a with respect to the radial direction.

Accordingly, in the variable nozzle device 20, the turbine 2, and the turbocharger 1 according to the present embodiment, as depicted in FIG. 4 (see FIG. 11), the working fluid 'g' (G) flows through the through hole 36 in accordance with the pressure difference between the upstream side (the side of the scroll flow passage 18) with respect to the flow direction of the working fluid G, which is the high-pressure side, and the downstream side with respect to the flow direction of the working fluid G, which is the low-pressure side, and the working fluid 'g' (G) inside the scroll flow passage 18 is injected into the nozzle flow passage 4 at the inner side, with respect to the radial direction, of the pivot axis O2 of the variable nozzle vane 6 from the first opening 36a of the through hole 36.

As the working fluid 'g' injected from the through hole 36 joins the working fluid G flowing through the nozzle flow passage 4 toward the turbine wheel 3 from the plurality of variable nozzle vanes 6, the flow of the working fluid G is guided toward the inner surface 32 at the hub side, and thereby it is possible to suppress deviation of the working fluid G toward the shroud, that is, suppress the drift of the working fluid G, without providing a protruding portion on the first surface 33 as in the typical variable nozzle device 100.

Furthermore, the smaller the opening degree of the variable nozzle vanes 6 in the small opening-degree range, the greater the pressure difference between the upstream side with respect to the flow direction of the working fluid G, which is the high-pressure side, and the downstream side with respect to the flow direction of the working fluid G, which is the low-pressure side. In other words, the pressure difference is greater in the intermediate opening-degree range than in the large opening-degree range, and in the small opening-degree range than in the intermediate opening-degree range of the variable nozzle vanes 6. Thus, it is possible to increase the injection force (injection velocity) of the working fluid 'g' injected from the through hole 36 further as the opening degree of the variable nozzle vanes 6 decreases.

Accordingly, in the small opening-degree range of the variable nozzle vanes 6 where a considerable drift of the working fluid G toward the shroud side is generated, it is possible to suppress the drift of the working fluid G effectively. In the large opening-degree range of the variable nozzle vanes 6 where the drift is not generated, the working fluid 'g' injected from the through hole 36 does not hinder the flow of the working fluid G. Thus, it is possible to suppress occurrence of fluid energy loss.

Therefore, with the variable nozzle device 20, the turbine 2, and the turbocharger 1 according to the present embodiment being provided with the through hole 36 formed through the first surface 33 and the second surface 35 of the nozzle plate body part 34, and the through hole 36 having the first opening 36a at the inner side of the pivot axis O2 of the variable nozzle vanes 6 with respect to the radial direction and the second opening 36b formed on the second surface 35 at the outer side of the first opening 36a with respect to the radial direction, it is possible to mitigate uneven flow of the working fluid G at the outlet of the turbine rotor blades 13, reduce mixing loss, and improve the turbine efficiency.

Accordingly, in addition to the above described advantage of having the variable nozzle vanes 6 in the large opening-degree range, which ensures the maximum flow rate, it is possible to reliably achieve the advantage of having the variable nozzle vanes 6 in the small opening-degree range, which improves of the turbine efficiency. In other words, it is possible to reduce fluid energy loss of the working fluid G in all ranges including the small opening-degree range and the large opening-degree range of the variable nozzle vanes 6, thereby improving the turbine efficiency even more effectively.

The same advantageous effect as the above can be achieved when the second opening 36b of the through hole 36 is disposed at the same position as the first opening 36a with respect of the radial direction.

Furthermore, as depicted in FIG. 2, with the plurality of through holes 36 disposed at intervals in the circumferential direction centered at the axis O1 and the working fluid 'g' being injected from the respective through holes 36, it is possible to effectively suppress drift of the working fluid G flowing through the turbine wheel 3 entirely in the circumferential direction in the small opening-degree range of the variable nozzle vanes 6. Furthermore, with each of the plurality of through holes 36 being disposed so as to make a pair with corresponding one of the plurality of variable nozzle vanes 6 at the inner side of the corresponding nozzle vane 6 with respect to the radial direction, it is possible to suppress drift of the working fluid G flowing through the turbine wheel 3 entirely in the circumferential direction more effectively.

Furthermore, when the through hole 36 is formed such that the opening area of the first opening 36a is smaller than that of the second opening 36b, it is possible to enhance the injection force (injection velocity) of the working fluid 'g' injected from the first opening 36a, and it is possible to suppress drift of the working fluid G flowing through the turbine wheel 3 even more effectively in the small opening-degree range of the variable nozzle vanes 6.

The variable nozzle device, the turbine, and the turbocharger according to the first embodiment of the present disclosure have been described. Nevertheless, the first embodiment is not limitative and may be modified as needed without departing the scope of the disclosure.

Figure 5:
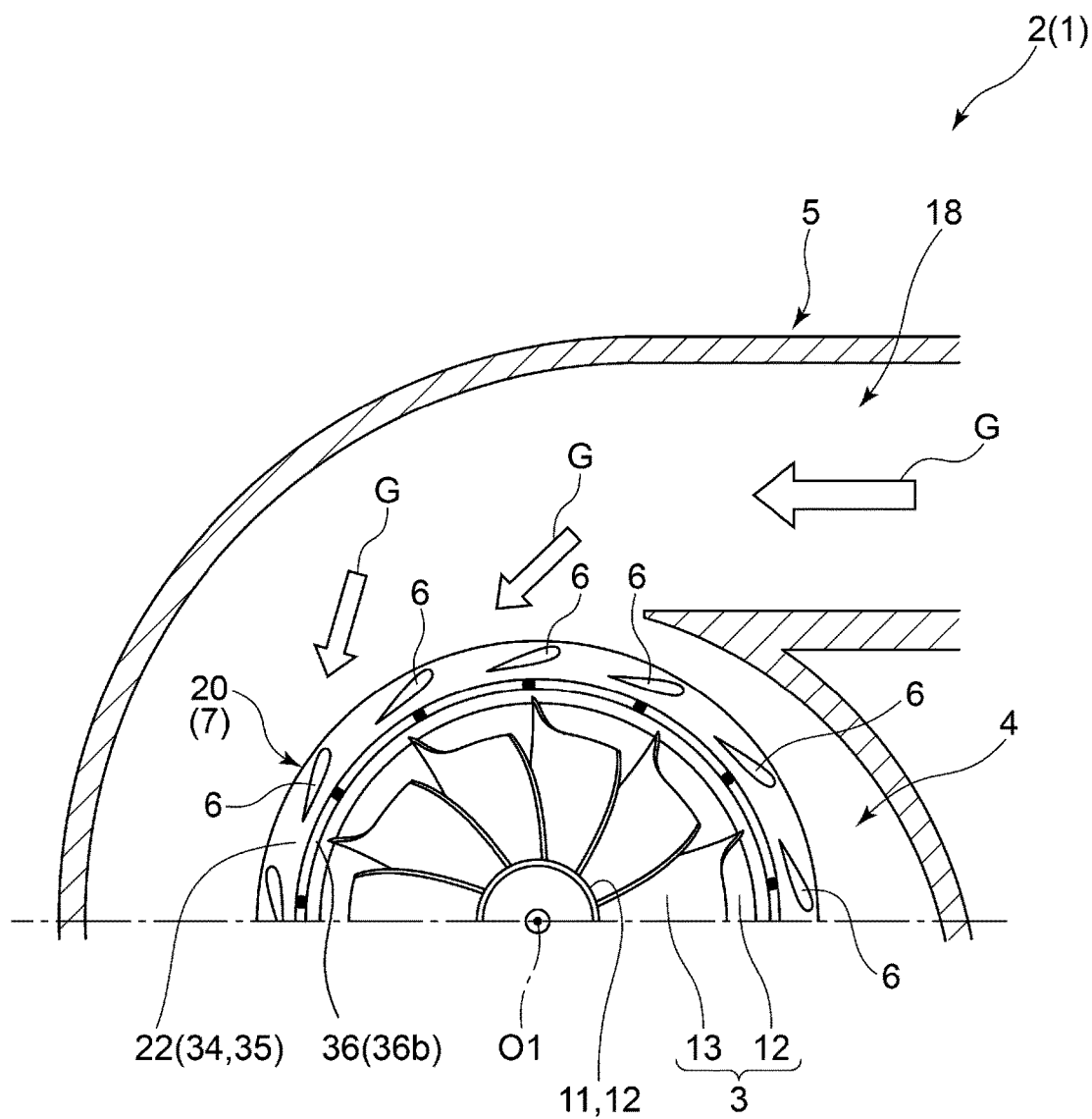
FIG. 5 is a cross-sectional view showing a modified example of the variable nozzle device, the turbine, and the turbocharger according to the first embodiment as seen in the axis direction (downstream side in the flow direction of the working fluid).

For instance, as depicted in FIG. 5, the through hole 36 may be formed to include a single annular flow passage extending along the circumferential direction. In this case, the working fluid 'g' is injected from the first opening 36a extending entirely in the circumferential direction, and thus it is possible to suitably suppress drift of the working fluid G flowing through the turbine wheel 3 entirely in the circumferential direction in the small opening-degree range of the variable nozzle vanes 6.

Furthermore, the configuration and modification examples of the first embodiment may be combined with the configuration and modification examples of the second embodiment described below, for instance, to achieve an advantageous effect in synergy.

Second Embodiment

Next, with reference to FIGS. 1, 6 to 10 and 11, a variable nozzle device, a turbine, and a turbocharger according to the second embodiment will be described. Herein, the variable nozzle device, the turbine, and the turbocharger according to the present embodiment are different from the variable nozzle device, the turbine, and the turbocharger according to the first embodiment in the configuration of the variable nozzle device, but otherwise the same. Thus, in the present embodiment, the same components as those in the first embodiment are associated with the same reference numerals, for instance, and not described in detail.

(Variable Nozzle Device)

Figure 6:
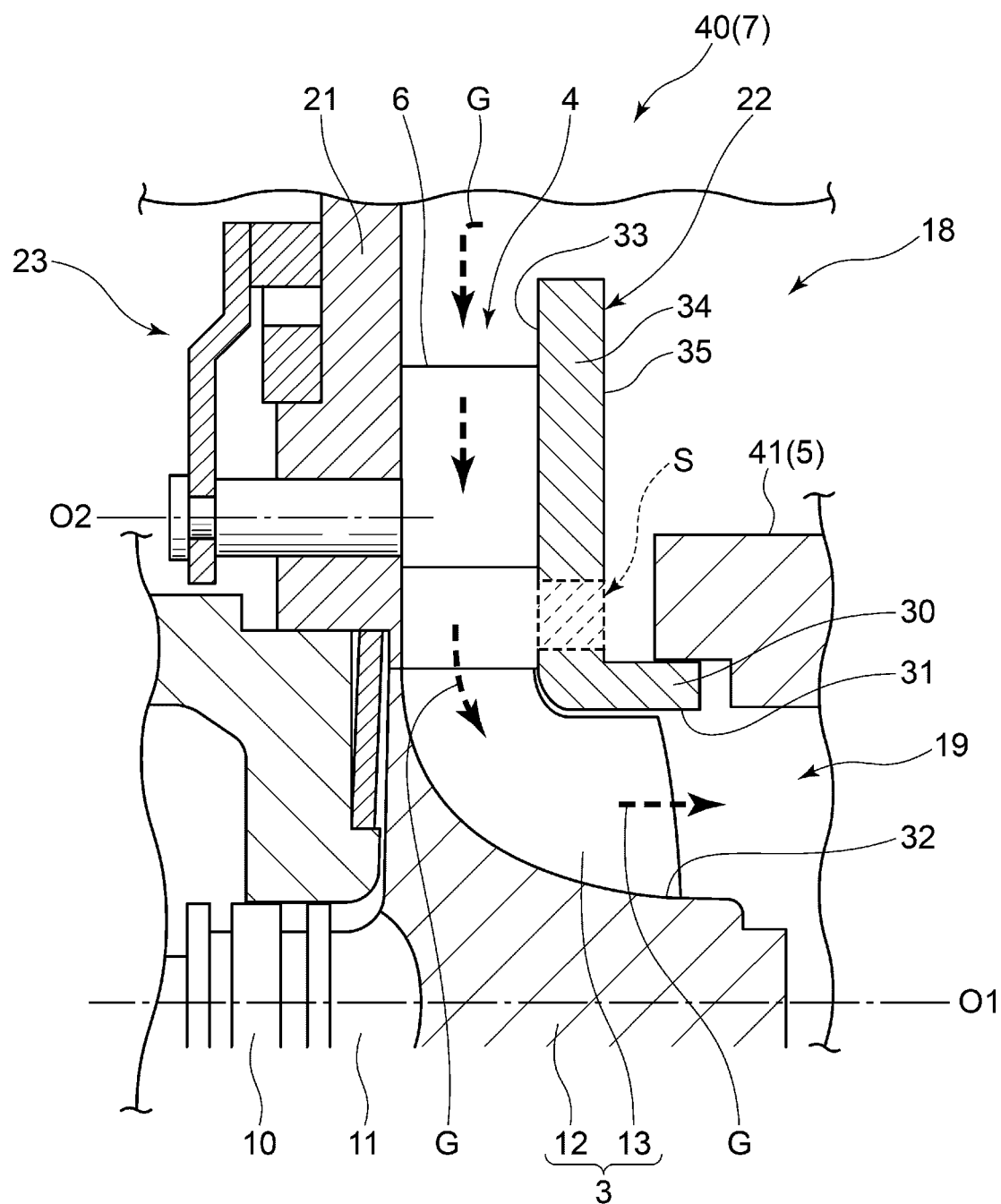
FIG. 6 is a cross-sectional view showing the position of a variable nozzle device according to the second embodiment.
Figure 7:
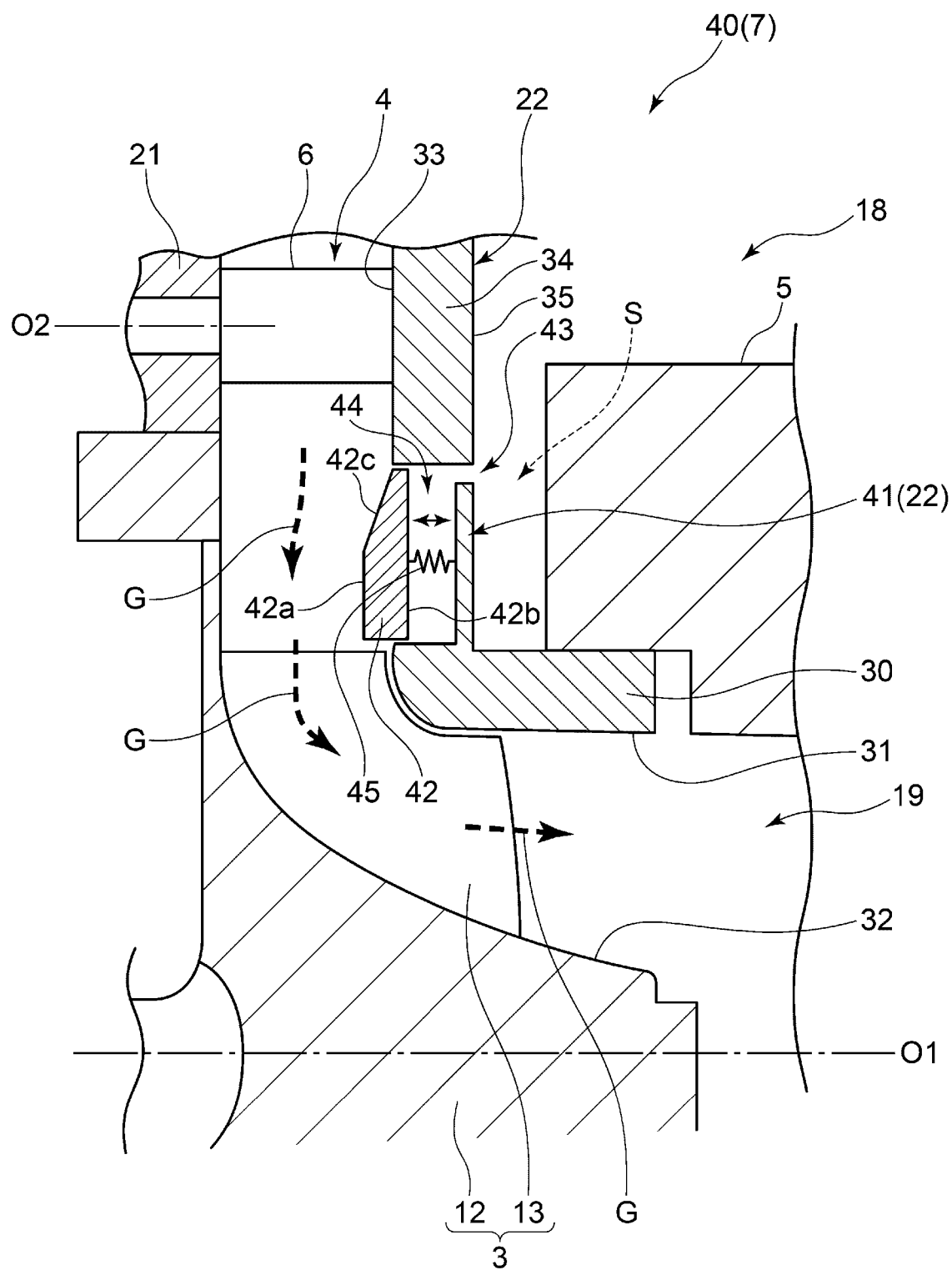
FIG. 7 is a cross-sectional view showing a variable nozzle device according to the second embodiment.

The variable nozzle device 40 according to the present embodiment includes, as depicted in FIGS. 6 and 7 (see FIGS. 1 and 11), a nozzle mount 21, a nozzle plate 22 including a nozzle plate body part 34 and a shroud part 30, and a plurality of variable nozzle vanes 6, similarly to the first embodiment.

On the other hand, the variable nozzle device 40 includes a slide member 42 at a location indicated by the S portion in FIG. 6, unlike the first embodiment.

Specifically, in the variable nozzle device 40 according to the present embodiment, as depicted in FIG. 7, the nozzle plate body part 34 of the nozzle plate 22 includes the first surface 33 facing the nozzle mount 21, and the slide member 42 configured to be capable of advancing and retreating with respect to the nozzle flow passage 4 from the first surface 33. Furthermore, the slide member 42 includes a first side 42a facing the nozzle flow passage 4 and a second side 42b opposite to the first side 42a, and configured to advance or retreat in accordance with the pressure difference between a pressure applied to the first side 42a and a pressure applied to the second side 42b.

Furthermore, the variable nozzle device 40 according to the present embodiment has a communication space 44 provided for the nozzle plate body part 34 between the slide member 42 and the second surface 35. The communication space 44 is in communication with the scroll flow passage 18 at the side of the second surface 35 via the through hole 43 having an opening on the second surface 35. In the communication space 44, a biasing member 45 such as a spring member is disposed. The biasing member 45 has a first end connected to a stationary member 41 such as the nozzle plate body part 34 and a second end connected to the second side 42b of the slide member 42, and biases the slide member 42 toward the inside of the communication space 44, that is, toward the second surface 35 of the nozzle plate body part 34.

Accordingly, in the variable nozzle device 40 according to the present embodiment, as depicted in FIG. 7 (see FIG. 11), the pressure at the upstream side in the flow direction of the working fluid G (the side of the scroll flow passage 18), which is the high-pressure side, is transmitted to the communication space 44 via the through hole 43 and applied to the second side 42b of the slide member 42, and the pressure at the downstream side in the flow direction of the working fluid G (the side of the nozzle flow passage 4), which is the low-pressure side, is applied to the first side 42a of the slide member 42. Furthermore, a biasing force of the biasing member 45 is applied to the slide member 42.

Furthermore, the slide member 42 according to the present embodiment slides (advances) in accordance with the pressure difference of the pressure applied to the first side 42a and the pressure applied to the second side 42b. In the small opening-degree range of the variable nozzle vanes 6 where the pressure difference is large, the first side 42a protrudes into the nozzle flow passage 4 with a protruding amount corresponding to the magnitude of the pressure difference.

That is, the slide member 42 according to the present embodiment is configured such that, for instance, in the intermediate opening-degree range and the large opening-degree range of the variable nozzle vanes 6 where the pressure difference between the first surface 33 and the second surface 35 of the nozzle plate body part 34 is somewhat small, the first side 42a is positioned proximate to the first surface 33 (including flush position) in response to the effect of the biasing force of the biasing member 45, and is retained in this retreat state.

Thus, when the variable nozzle vanes 6 are in the intermediate opening-degree range or the large opening-degree range, the slide member 42 does not protrude past the first surface 33, and thus it is possible to prevent the slide member 42 from becoming resistance that causes fluid energy loss and deterioration of the turbine efficiency like the protruding portion of the typical variable nozzle device 100.

On the other hand, in the small opening-degree range of the variable nozzle vanes 6, the pressure difference is large, and thus the pressure inside the communication space 44 rises and the force that presses the second side 42b of the slide member 42 increases relatively, and thereby the slide member 42 slides (advances) and the first side 42a thereof protrudes past the first surface 33 of the nozzle plate body part 34 into the nozzle flow passage 4.

Accordingly, in the small opening-degree range of the variable nozzle vanes 6, the working fluid G flows along the first side 42a of the protruding slide member 42, and the flow of the working fluid G is guided toward the hub. Thus, the drift of the working fluid G toward the shroud side is suppressed, which makes it possible to mitigate the uneven flow at the outlet of the turbine rotor blades 13 and reduce mixing loss, thereby improving the turbine efficiency.

Therefore, with the variable nozzle device 40, the turbine 2, and the turbocharger 1 according to the present embodiment, in addition to the above described the advantage of ensuring the maximum flow rate in the in the large opening-degree range of the variable nozzle vanes 6, it is possible to reliably achieve the advantage of improving the turbine efficiency in the small opening-degree range of the variable nozzle vanes 6. Furthermore, it is possible to suitably reduce fluid energy loss of the working fluid G in either one of the small opening-degree range or the large opening-degree range of the variable nozzle vanes 6, and improve the turbine efficiency effectively.

Furthermore, in the variable nozzle device 40, the turbine 2, and the turbocharger 1 according to the present embodiment, as depicted in FIG. 7, it is preferable that the first side 42a of the slide member 42 has a tapered surface 42c configured to have a distance to the nozzle mount which decreases inward in the radial direction.

In this case, in the small opening-degree range of the variable nozzle vanes 6, it is possible to let the working fluid G flow smoothly along the tapered surface 42c of the first side 42a of the protruding slide member 42, and suppress occurrence of fluid energy loss due to disturbance of the flow of the working fluid G by the protruding slide member 42.

Furthermore, in the variable nozzle device 40, the turbine 2, and the turbocharger 1 according to the present embodiment, the biasing member 45 is provided to apply a biasing force to the slide member 42. In this way, it is possible to protrude the slide member 42 with a protruding amount corresponding to the pressure difference, and allow the slide member 42 to retreat suitably and automatically with the biasing force of the biasing member 45 as the pressure difference decreases.

The variable nozzle device, the turbine, and the turbocharger according to the second embodiment of the present disclosure have been described. Nevertheless, the first and second embodiments are not limitative and may be modified as needed without departing the scope of the disclosure by, for instance, combining the configuration and modification examples of the embodiments.

For instance, the configurations and modification examples of the first and second embodiments may be selected and combined as needed. In this case, it is possible to achieve the effect to improve the rotor blade incidence characteristics and the effect to improve the turbine efficiency even more effectively, or in synergy in some cases.

Figure 8:
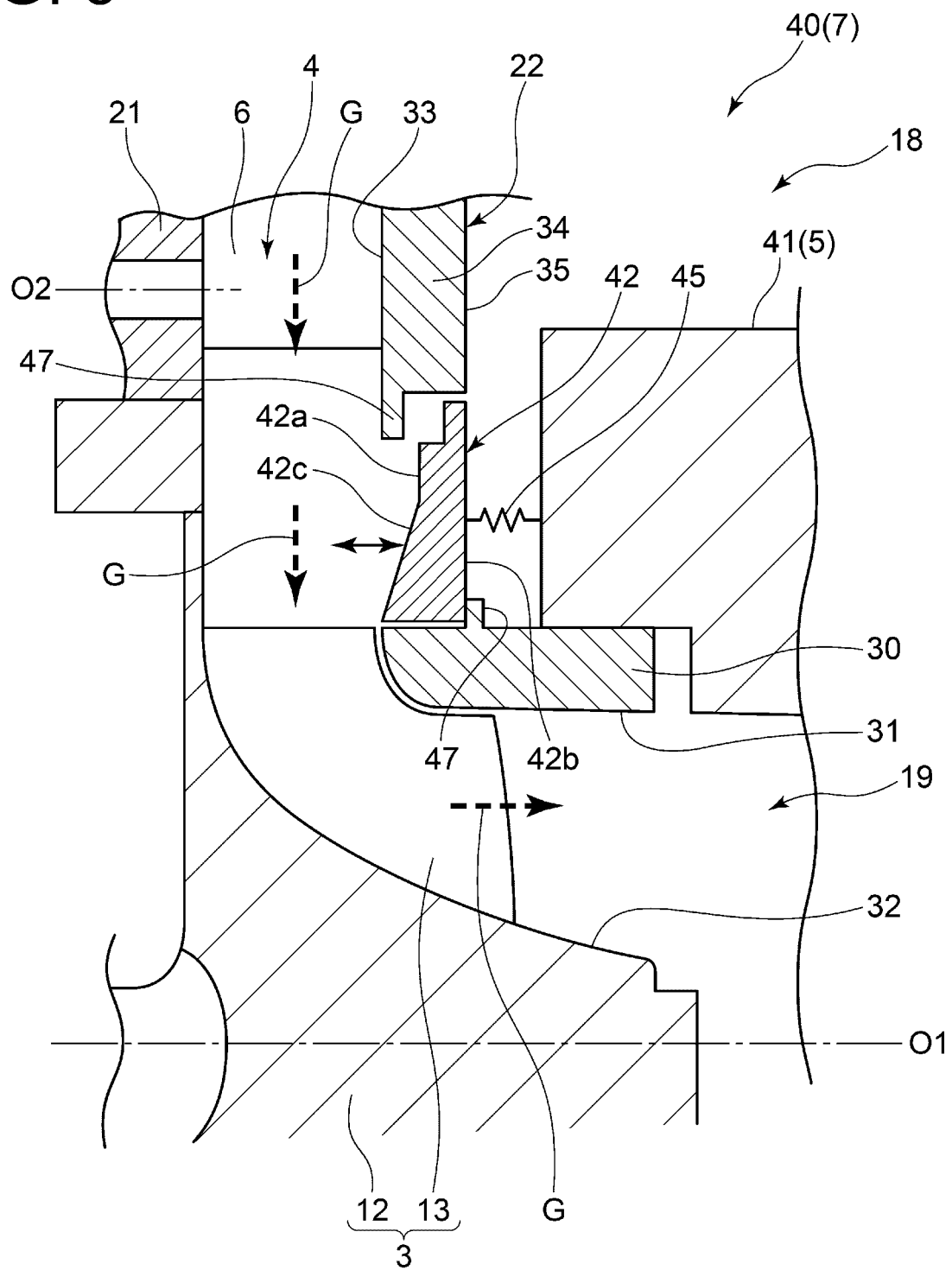
FIG. 8 is a cross-sectional view showing a modified example of a variable nozzle device according to the second embodiment.
Figure 9:
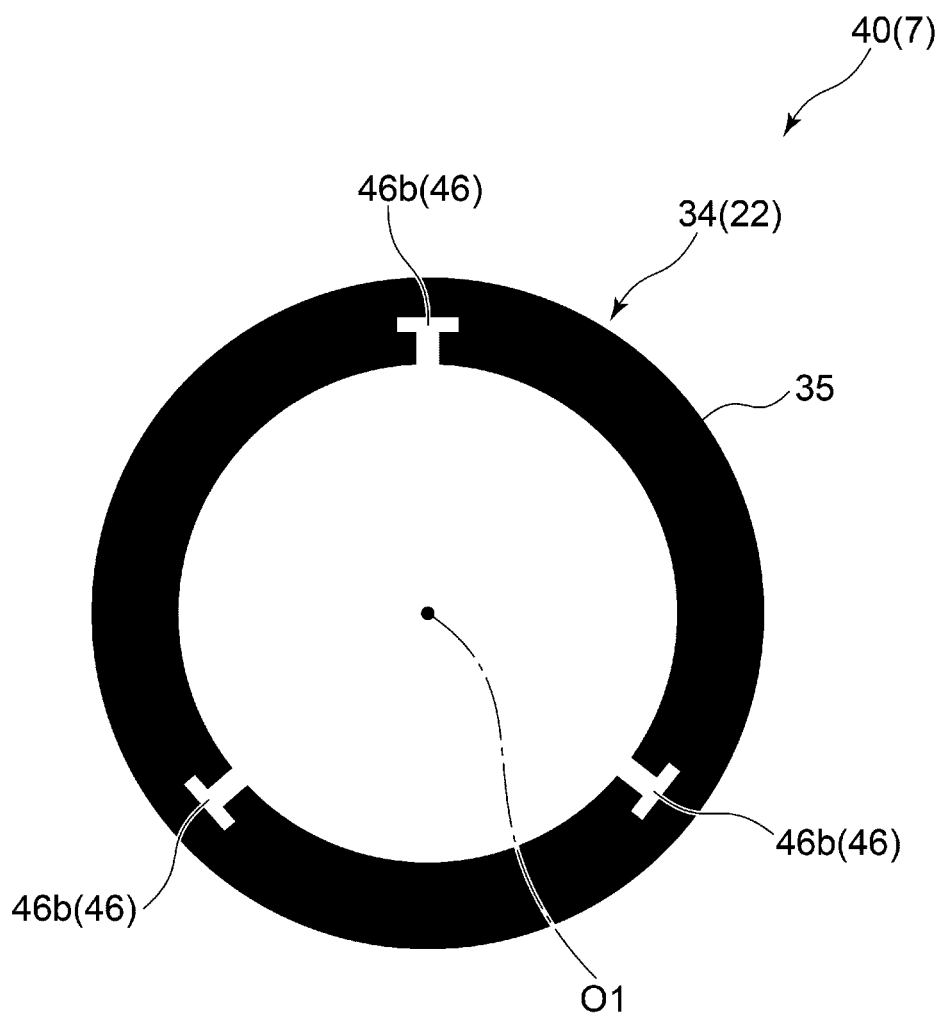
FIG. 9 is a view showing a modified example of the nozzle plate (nozzle plate body part) of the variable nozzle device according to the second embodiment as seen in the axis direction (downstream side in the flow direction of the working fluid).
Figure 10:
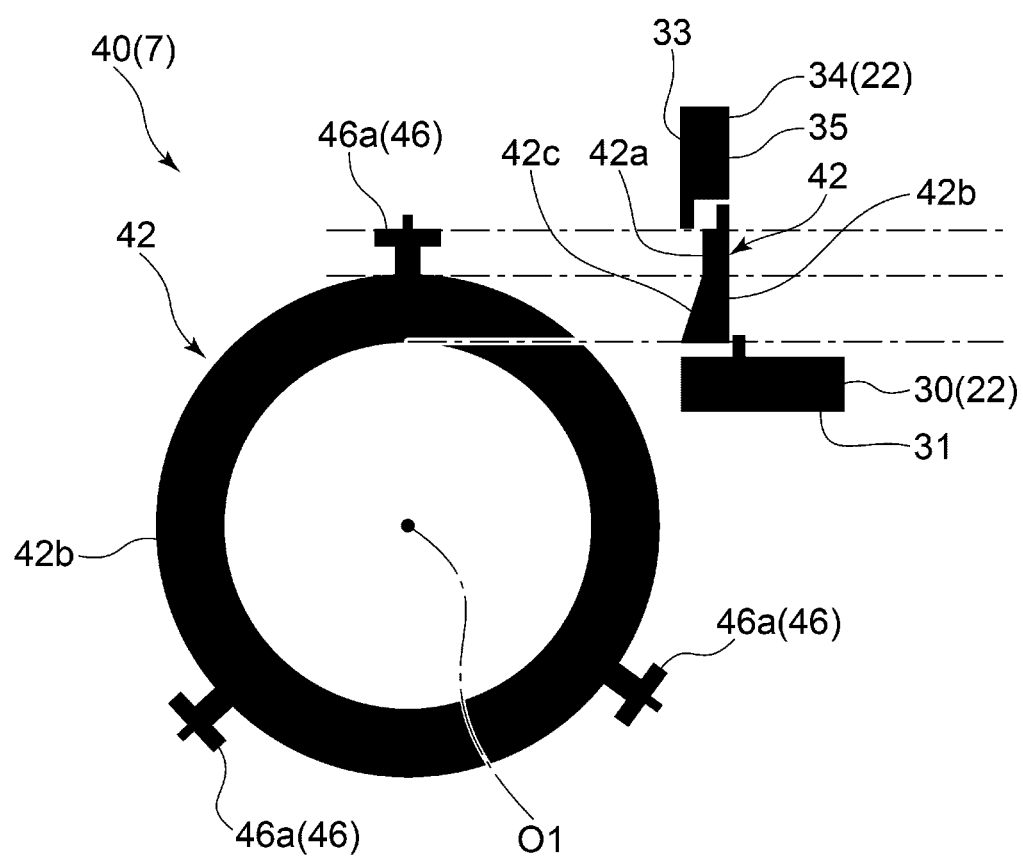
FIG. 10 is a view showing a modified example of the slide member of the variable nozzle device according to the second embodiment as seen in the axis direction (downstream side in the flow direction of the working fluid).

Furthermore, for instance, as depicted in FIGS. 8 to 10 for instance, the nozzle plate 22 (nozzle plate body part 34) and the slide member 42 may include an engagement portion 46 (engagement protruding portion 46a, engagement recess portion 46b). The engagement portions 46 engage with one another and supports the slide member 42 so as to be capable of sliding with respect to the nozzle plate 22, and advancing and retreating with reference to the first surface 33 of the nozzle plate 22.

In this case, the pressure at the first surface 33 side being the low pressure side and the pressure at the second surface 35 side being the high pressure side are directly applied to the first side 42a and the second side 42b of the slide member 42 respectively, and it is possible to let the slide member 42 slide automatically in accordance with the pressure difference of the above pressures. Accordingly, it is possible to achieve the same advantageous effects as the present embodiment and improve the rotor-blade incidence characteristics and the turbine efficiency.

Furthermore, in this case, by forming the engagement portion 46 to have a T shape, for instance, it is possible to prevent the slide member 42 from moving forward and backward in the radial direction and the circumferential direction about the axis O1.

Furthermore, by providing the stopper 47, it is possible to limit the protruding amount and the retreat amount of the slide member 42, that is, the advance-retreat amount of the slide member 42, and thus it is possible to control the position of the slide member 42 suitably.

Furthermore, in the variable nozzle device 40 according to the present embodiment, when P1 is the first pressure at the side of the first surface 33 of the nozzle plate body part 34, that is, the first pressure at the low-pressure side of a portion of the variable nozzle vane 6 at the inner side of the pivot axis O2 with respect to the radial direction, P2 is the second pressure at the high-pressure side at the side of the second surface 35, and P3 is a predetermined threshold of the pressure difference between the first pressure P1 and the second pressure P2, the slide member 42 may be configured to protrude past the first surface 33 toward the nozzle mount 21 (nozzle flow passage 4) when an expression $P2-P1 > P3$ is satisfied, and retreat to be housed between the first surface 33 and the second surface 35 when an expression P2−P1≤P3 is satisfied.

That is, as long as it is possible to improve the rotor-blade incidence characteristics and enhance the turbine efficiency, the configuration may not necessarily be limited to the present embodiment.

Finally, the contents described in the above respective embodiments can be understood as follows, for instance.

(1) According to an aspect, a variable nozzle device (the variable nozzle device 20 of the first embodiment) is a variable nozzle device for a variable geometry turbocharger (the turbocharger 1 of the first embodiment) and includes: a nozzle mount (the nozzle mount 21 of the first embodiment); a nozzle plate (the nozzle plate 22 of the first embodiment) disposed so as to face the nozzle mount, the nozzle plate forming a nozzle flow passage (nozzle flow passage 4 of the first embodiment) having an annular shape between the nozzle plate and the nozzle mount; and a plurality of variable nozzle vanes (variable nozzle vanes 6 of the first embodiment) disposed at a predetermined interval in a circumferential direction of the nozzle flow passage so as to be individually rotatable about a pivot axis (pivot axis O2 of the first embodiment). The nozzle plate includes a first surface (the first surface 33 of the first embodiment) facing the nozzle mount, a second surface (the second surface 35 of the first embodiment) opposite to the first surface, and at least one through hole (through hole 36 of the first embodiment) formed through the first surface and the second surface. The at least one through hole has a first opening (the first opening 36a of the first embodiment) formed on the first surface at an inner side of the pivot axis with respect to a radial direction, and a second opening (the second opening 36b of the first embodiment) formed on the second surface at an outer side of the first opening with respect to the radial direction or at the same position as the first opening with respect to the radial direction.

With the variable nozzle device according to the present disclosure, as the working fluid injected from the through hole joins the working fluid flowing through the nozzle flow passage toward the turbine wheel from the plurality of variable nozzle vanes, the flow of the working fluid is guided toward the inner surface at the hub side, and thereby it is possible to suppress deviation of the flow of the working fluid toward the shroud, that is, suppress the drift of the working fluid.

Furthermore, the smaller the opening degree of the variable nozzle vanes in the small opening-degree range, the greater the pressure difference between the upstream side with respect to the flow direction of the working fluid, which is the high-pressure side, and the downstream side with respect to the flow direction of the working fluid, which is the low-pressure side. In other words, the pressure difference is greater in the intermediate opening-degree range than in the large opening-degree range, and greater in the small opening-degree range than in the intermediate opening-degree range of the variable nozzle vanes. Thus, it is possible to further increase the injection force (injection velocity) of the working fluid injected from the through hole as the opening degree of the variable nozzle vanes decreases.

Accordingly, in the small opening-degree range of the variable nozzle vanes where considerable drift of the working fluid toward the shroud side is generated, it is possible to suppress the drift of the working fluid effectively. In the large opening-degree range of the variable nozzle vanes where the drift is not generated (considerable drift is not generated), the working fluid injected from the through hole does not hinder the flow of the working fluid, and thus it is possible to suppress occurrence of fluid energy loss.

Thus, it is possible to reduce fluid energy loss of a working fluid in all ranges including the small opening-degree range and the large opening-degree range of the variable nozzle vanes, and improve the turbine efficiency even more effectively.

(2) The variable nozzle device according to another aspect is the variable nozzle device according to the above (1), and the at least one through hole includes a plurality of through holes disposed at intervals in the circumferential direction.

With the variable nozzle device according to the present disclosure, a plurality of through holes are disposed at intervals in the circumferential direction and the working fluid is injected from the respective through holes. Accordingly, it is possible to effectively suppress drift of the working fluid flowing through the turbine wheel entirely in the circumferential direction in the small opening-degree range of the variable nozzle vanes.

(3) The variable nozzle device according to another aspect is the variable nozzle device according to the above (1), and the at least one through hole includes a single annular flow passage extending in the circumferential direction.

With the variable nozzle device according to the present disclosure, the at least one through hole includes a single annular flow passage extending along the circumferential direction, and thus the working fluid is injected from the first opening extending in the circumferential direction. Thus, it is possible to suitably suppress drift of the working fluid flowing through the turbine wheel entirely in the circumferential direction in the small opening-degree range of the variable nozzle vanes.

(4) The variable nozzle device according to another aspect is the variable nozzle device according to any one of the above (1) to (3), and the at least one through hole is formed such that the first opening of the nozzle plate has a smaller opening area than the second opening of the nozzle plate.

With the variable nozzle device according to the present disclosure, the through hole is formed such that the opening area of the first opening is smaller than that of the second opening, and thus it is possible to enhance the injection force (injection velocity) of the working fluid injected from the first opening, and it is possible to suppress drift of the working fluid flowing through the turbine wheel even more effectively in the small opening-degree range of the variable nozzle vanes.

(5) According to an aspect, a variable nozzle device (the variable nozzle device 40 of the second embodiment) is a variable nozzle device for a variable geometry turbocharger (the turbocharger 1 of the second embodiment) and includes: a nozzle mount (the nozzle mount 21 of the second embodiment); a nozzle plate (the nozzle plate 22 of the second embodiment) disposed so as to face the nozzle mount, the nozzle plate forming a nozzle flow passage (nozzle flow passage 4 of the second embodiment) having an annular shape between the nozzle plate and the nozzle mount; and a plurality of variable nozzle vanes (variable nozzle vanes 6 of the second embodiment) disposed at a predetermined interval in a circumferential direction of the nozzle flow passage so as to be individually rotatable about a pivot axis (pivot axis O2 of the second embodiment). The nozzle plate includes a first surface (the first surface 33 of the second embodiment) facing the nozzle mount and a slide member (the slide member 42 of the second embodiment) configured to be capable of advancing and retreating with respect to the nozzle flow passage from the first surface. The slide member includes a first side (the first side 42a of the second embodiment) facing the nozzle flow passage and a second side (the second side 42b of the second embodiment) opposite to the first side, the slide member being configured to advance or retreat in accordance with a pressure difference between a pressure applied to the first side and a pressure applied to the second side.

With the variable nozzle device according to the present disclosure, in the intermediate opening-degree range and the large opening-degree range of the variable nozzle vanes where the pressure difference between the first surface and the second surface is somewhat small, the first side of the slide member is positioned proximate to the first surface (including flush position), and is retained in this retreat state. Accordingly, in the intermediate opening-degree range and the large opening-degree range of the variable nozzle vanes, the slide member does not protrude past the first surface, and thus it is possible to prevent the slide member from becoming resistance that causes fluid energy loss and deterioration of the turbine efficiency.

On the other hand, in the small opening-degree range of the variable nozzle vanes, the pressure difference is large, and the force that presses the second side of the slide member increases relatively. Thus, the slide member slides (advances) and the first side of the slide member protrudes into the nozzle flow passage past the first side. Accordingly, in the small opening-degree range of the variable nozzle vanes, the working fluid flows along the first side of the protruding slide member, and the flow of the working fluid is guided toward the hub. Thus, the drift of the working fluid toward the shroud side is suppressed, which makes it possible to mitigate uneven flow at the outlet of the turbine rotor blades and reduce mixing loss, thereby improving the turbine efficiency.

Therefore, in the small opening-degree range of the variable nozzle vanes where a considerable drift of the working fluid toward the shroud side is generated, it is possible to suppress the drift of the working fluid effectively. In the large opening-degree range of the variable nozzle vanes where the drift is not generated (considerable drift is not generated), the working fluid injected from the through hole does not hinder the flow of the working fluid, and thus it is possible to suppress occurrence of fluid energy loss.

Thus, it is possible to reduce fluid energy loss of the working fluid in all ranges including the small opening-degree range and the large opening-degree range of the variable nozzle vanes, and thereby improve the turbine efficiency even more effectively.

(6) The variable nozzle device according to another aspect is the variable nozzle device according to the above (5), and the first side of the slide member has a tapered surface (tapered surface 42c of the second embodiment) configured such that a distance to the nozzle mount decreases inward in the radial direction.

With the variable nozzle device according to the present disclosure, in the small opening-degree range of the variable nozzle vanes, it is possible to let the working fluid flow smoothly along the tapered surface of the first side of the protruding slide member, and suppress occurrence of fluid energy loss due to disturbance of the flow of the working fluid by the protruding slide member.

(7) The variable nozzle device according to another aspect is the variable nozzle device according to the above (5) or (6) and further includes a spring member (biasing member 45 of the second embodiment) having a first end side fixed to the second side of the slide member and a second end side fixed to a stationary member (the stationary member 41 (turbine housing 5, nozzle plate 22) of the second embodiment).

With the variable nozzle device according to the present disclosure, the spring member is provided so that a biasing force is applied to the slide member, and thus it is possible to protrude the slide member with a protruding amount corresponding to the pressure difference, and allow the slide member to retreat suitably and automatically with the biasing force of the spring member as the pressure difference decreases.

(8) The variable nozzle device according to another aspect is the variable nozzle device according to any one of the above (5) to (7) and further includes a stopper (the stopper of the second embodiment) which limits an advance-retreat amount of the slide member.

With the variable nozzle device according to the present embodiment, by providing the stopper, it is possible to limit the protruding amount and the retreat amount of the slide member, that is, the advance-retreat amount of the slide member, and thus it is possible to control the position of the slide member suitably.

(9) According to an aspect, a turbine (turbine 2 according to the first embodiment and the second embodiment) includes: a rotational shaft; (rotational shaft 11 of the first embodiment and the second embodiment); a turbine wheel (turbine wheel 3 according to the first embodiment and the second embodiment) disposed on a first end side of the rotational shaft; and the variable nozzle device according to any one of the above (1) to (8).

With the turbine according to the present disclosure, it is possible to provide a turbine that has the advantageous effects of the variable nozzle device according to any one of the above (1) to (8).

(10) According to an aspect, a turbocharger (turbocharger 1 of the first embodiment and the second embodiment)) includes the turbine according to the above (9).

With the turbocharger according to the present disclosure, it is possible to provide a turbocharger that has the advantageous effects of the turbine and the variable nozzle device according to the above (9).

REFERENCE SIGNS LIST

1 Turbocharger
2 Turbine
3 Turbine wheel
4 Nozzle flow passage
5 Turbine housing (stationary member)
6 Variable nozzle vane
11 Rotational shaft
12 Turbine hub
13 Turbine rotor blade
20 Variable nozzle device
21 Nozzle mount
22 Nozzle plate
30 Shroud part
33 First surface
34 Nozzle plate body part
35 Second surface
36 Through hole
36a First opening
36b Second opening
40 Variable nozzle device
41 Stationary member
42 Slide member
42a First side 42b Second side
42c Tapered surface
43 Through hole
44 Communication space
45 Biasing member (spring member)
100 Typical variable nozzle device
G, g Working fluid (exhaust gas)
O1 Axis
O2 Pivot axis

The invention claimed is:

1. A variable nozzle device for a variable geometry turbocharger, comprising:
a nozzle mount;
a nozzle plate disposed so as to face the nozzle mount, the nozzle plate forming a nozzle flow passage having an annular shape between the nozzle plate and the nozzle mount; and
a plurality of variable nozzle vanes disposed at a predetermined interval in a circumferential direction of the nozzle flow passage so as to be individually rotatable about a pivot axis,
wherein the nozzle plate includes a first surface facing the nozzle mount, a second surface opposite to the first surface, and at least one through hole formed through the first surface and the second surface,
wherein the at least one through hole has a first opening formed on the first surface at an inner side of the pivot axis with respect to a radial direction, and a second opening formed on the second surface at an outer side of the first opening with respect to the radial direction or at the same position as the first opening with respect to the radial direction, and
wherein the at least one through hole is formed such that the first opening of the nozzle plate has a smaller opening area than the second opening of the nozzle plate.

2. The variable nozzle device according to claim 1, wherein the at least one through hole includes a plurality of through holes disposed at intervals in the circumferential direction.

3. A turbine, comprising:
a rotational shaft;
a turbine wheel disposed on a first end side of the rotational shaft; and
the variable nozzle device according to claim 1.

4. A turbocharger comprising the turbine according to claim 3.

5. A variable nozzle device for a variable geometry turbocharger, comprising: a nozzle mount;
a nozzle plate disposed so as to face the nozzle mount, the nozzle plate forming a nozzle flow passage having an annular shape between the nozzle plate and the nozzle mount; and
a plurality of variable nozzle vanes disposed at a predetermined interval in a circumferential direction of the nozzle flow passage so as to be individually rotatable about a pivot axis,
wherein the nozzle plate includes a first surface facing the nozzle mount, a second surface opposite to the first surface, and at least one through hole formed through the first surface and the second surface,
wherein the at least one through hole has a first opening formed on the first surface at an inner side of the pivot axis with respect to a radial direction, and a second opening formed on the second surface at an outer side of the first opening with respect to the radial direction or at the same position as the first opening with respect to the radial direction, and
wherein the at least one through hole includes a single annular flow passage extending in the circumferential direction.

6. A turbine, comprising:
a rotational shaft;
a turbine wheel disposed on a first end side of the rotational shaft; and
the variable nozzle device according to claim 5.

7. A turbocharger comprising the turbine according to claim 6.

8. A variable nozzle device for a variable geometry turbocharger, comprising:
a nozzle mount;
a nozzle plate disposed so as to face the nozzle mount, the nozzle plate forming a nozzle flow passage having an annular shape between the nozzle plate and the nozzle mount; and
a plurality of variable nozzle vanes disposed at a predetermined interval in a circumferential direction of the nozzle flow passage so as to be individually rotatable about a pivot axis,
wherein the nozzle plate includes a first surface facing the nozzle mount and a slide member configured to be capable of advancing and retreating with respect to the nozzle flow passage from the first surface, and
wherein the slide member includes a first side facing the nozzle flow passage and a second side opposite to the first side, the slide member being configured to advance or retreat in accordance with a pressure difference between a pressure applied to the first side and a pressure applied to the second side.

9. The variable nozzle device according to claim 5, wherein the first side of the slide member has a tapered surface configured such that a distance to the nozzle mount decreases inward in the radial direction.

10. The variable nozzle device according to claim 8, further comprising a spring member having a first end side fixed to the second side of the slide member and a second end side fixed to a stationary member.

11. The variable nozzle device according to claim 8, further comprising a stopper which limits an advance-retreat amount of the slide member.

12. A turbine, comprising:
a rotational shaft;
a turbine wheel disposed on a first end side of the rotational shaft; and
the variable nozzle device according to claim 8.

13. A turbocharger comprising the turbine according to claim 12.

* * * * *